(12) United States Patent
Chou et al.

(10) Patent No.: US 7,383,054 B2
(45) Date of Patent: Jun. 3, 2008

(54) APPARATUS OF PUBLIC LAND MOBILE NETWORK SELECTION AND METHOD OF THE SAME

(75) Inventors: Ming-Ying Chou, Keelung (TW); Sung-Yao Lin, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 594 days.

(21) Appl. No.: 11/003,670

(22) Filed: Dec. 3, 2004

(65) Prior Publication Data

US 2005/0153722 A1    Jul. 14, 2005

(30) Foreign Application Priority Data

Dec. 5, 2003 (TW) .............................. 92134486 A
Dec. 1, 2004 (TW) .............................. 93136987 A

(51) Int. Cl.
H04Q 7/20 (2006.01)
H04B 7/00 (2006.01)
H04L 12/43 (2006.01)

(52) U.S. Cl. .................. 455/512; 455/522; 455/452.2; 370/461

(58) Field of Classification Search ................ 455/436, 455/437, 438, 453, 502, 444, 522, 512, 513, 455/452.2; 370/461
See application file for complete search history.

(56) References Cited

U.S. PATENT DOCUMENTS 5,999,811 A * 12/1999 Molne ..................... 455/432.3
6,434,389 B1 * 8/2002 Meskanen et al. .......... 455/437
6,826,414 B1 * 11/2004 Reynolds et al. ........... 455/555
2005/0079824 A1 * 4/2005 Rick et al. ................ 455/67.11

FOREIGN PATENT DOCUMENTS

WO     WO 02/069661 A2    9/2002

* cited by examiner

*Primary Examiner*—Tilahun Gesesse
(74) *Attorney, Agent, or Firm*—Hoffman, Warnick & D'Alessandro, LLC

(57) ABSTRACT

A method and an apparatus for selecting a public land mobile network (PLMN) for a mobile station are provided. The method and the apparatus according to this invention use the first and the second system information included in the broadcasting information broadcasted by a base station to find out all of the base stations belonging to the same PLMN as that base station in the base station table, and group those base stations belonging to the same PLMN as a base station group. The method and the apparatus according to this invention only need to synchronize with one base station in a base station group, and the other base stations belonging to the same base station group as that base station are known. Accordingly, the selection method according to this invention can substantially reduce the time for selecting a PLMN and improve the corresponding efficiency.

33 Claims, 6 Drawing Sheets

| BASE STATION | BASE STATION CODE | BASE STATION POWER |
|---|---|---|
| 1 | 10 | -55 DB |
| 2 | 23 | -58 DB |
| 3 | 12 | -62 DB |
| 4 | 88 | -64 DB |
| 5 | 66 | -68 DB |
| 6 | 18 | -69 DB |
| 7 | 107 | -70 DB |
| 8 | 134 | -71 DB |
| 9 | 54 | -72 DB |
| 10 | 35 | -74 DB |

FIG. 1 (PRIOR ART)

| BASE STATION | BASE STATION CODE | BASE STATION POWER | PLMN |
|---|---|---|---|
| 1 | 10 | -55 DB | FF |
| 2 | 23 | -58 DB | FF |
| 3 | 12 | -62 DB | FF |
| 4 | 88 | -64 DB | FF |
| 5 | 66 | -68 DB | FF |
| 6 | 18 | -69 DB | FF |
| 7 | 107 | -70 DB | FF |
| 8 | 134 | -71 DB | FF |
| 9 | 54 | -72 DB | FF |
| 10 | 35 | -74 DB | FF |

FIG. 2A

| BASE STATION | BASE STATION CODE | BASE STATION POWER | PLMN |
|---|---|---|---|
| 1 | 10 | -55 DB | 2 |
| 2 | 23 | -58 DB | FF |
| 3 | 12 | -62 DB | FF |
| 4 | 88 | -64 DB | 2 |
| 5 | 66 | -68 DB | FF |
| 6 | 18 | -69 DB | FF |
| 7 | 107 | -70 DB | 2 |
| 8 | 134 | -71 DB | FF |
| 9 | 54 | -72 DB | 2 |
| 10 | 35 | -74 DB | FF |

FIG. 2B

| BASE STATION | BASE STATION CODE | BASE STATION POWER | PLMN |
|---|---|---|---|
| 1 | 10 | -55 dB | 2 |
| 2 | 23 | -58 dB | 3 |
| 3 | 12 | -62 dB | 3 |
| 4 | 88 | -64 dB | 2 |
| 5 | 66 | -68 dB | 3 |
| 6 | 18 | -69 dB | 3 |
| 7 | 107 | -70 dB | 2 |
| 8 | 134 | -71 dB | 3 |
| 9 | 54 | -72 dB | 2 |
| 10 | 35 | -74 dB | ff |

FIG. 2C

APPARATUS OF PUBLIC LAND MOBILE NETWORK SELECTION AND METHOD OF THE SAME

BACKGROUND OF the INVENTION

1. Field of the Invention

The present invention relates to a method and an apparatus for selecting a public land mobile network (PLMN). More specifically, this invention relates to a method and an apparatus that can shorten the time needed to select a PLMN.

2. Description of the Prior Art

When a user turns on a mobile phone, the mobile phone must select a PLMN for providing communication services. According to the Global System for Mobile communication (GSM) specifications, when a mobile phone selects a PLMN, the registered public land mobile network (RPLMN) that the mobile phone registered last time is the first priority PLMN, and the home public land mobile network (HPLMN) for the mobile phone is the second priority PLMN. In other words, when selecting a PLMN, a mobile phone must select a PLMN with higher priority according to the specifications. Only when the first priority PLMN (for example, RPLMN) cannot be selected, a mobile phone can select the second priority PLMN (for example, HPLMN) to provide communication services.

Every mobile phone has a base station table. The first priority PLMN cannot be selected when there is no base station in the base station table belonging to the first priority PLMN. Because no base station belonging to the first priority PLMN can be selected, the mobile phone cannot select the first priority PLMN.

Please refer to FIG. 1. FIG. 1 shows a base station table for a prior art method of selecting a PLMN. When a mobile phone is turned on, the mobile phone monitors the broadcasting information broadcasted by a plurality of base stations in the vicinity. Assume the mobile phone can monitor broadcasting information broadcasted by ten base stations. After receiving and measuring the broadcasting information of the ten base stations, the mobile phone establishes a base station table as shown in FIG. 1. The base station table includes a base station code field (cell_arfcn) for recording the base station codes of the ten base stations and a base station power field (cell_rlac) for recording the power values of the ten pieces of broadcasting information broadcasted by the ten base station. As shown in FIG. 1, the power values of the ten pieces of broadcasting information are recorded in the base station table in sequence according to the magnitudes of the power values (the upper ones have larger power values than the lower ones).

In the prior art method for selecting a PLMN, a mobile phone sequentially searches the PLMN to which each of the base stations in the base station table belongs. In other words, the mobile phone first searches the PLMN to which the base station 10 having a base station code "10" belongs.

Before reading the broadcasting information broadcasted by a base station, a mobile station, such as a mobile phone, must first synchronize with the base station. According to the third system information (SI3) included in the broadcasting information, the PLMN to which the base station belongs can be known. Therefore, the mobile station can determine whether a base station belongs to the first priority PLMN according to the SI3 for the base station. If the determined result is YES, then the mobile station selects the base station as a serving base station for providing communication services, i.e. the mobile station selects the PLMN to which the base station belongs as the serving PLMN for providing communication services.

As mentioned above, a mobile phone sequentially searches the PLMN to which each of the base stations in the base station table belongs. When the searched PLMN to which a base station belongs is the first priority PLMN, the mobile station selects the base station as a serving base station.

If the base station corresponding to the greatest power value of the broadcasting information in the base station table does not belong to the first priority PLMN, the mobile station repeats the foregoing steps for the next base station in the base station table until a base station belonging to the first priority PLMN is found. If no base station belonging to the first priority PLMN is found after all the base stations in the base station table are searched, the mobile station sets the second priority PLMN as the next target PLMN. Foregoing steps are repeated for searching a base station belonging to the second priority PLMN.

Accordingly, the prior art method for selecting a PLMN spends much time on sequentially searching the PLMN for each of the base stations in the base station table and determining whether the searched result conforms to the target PLMN, for instance, the first priority PLMN, the second priority PLMN, etc. Besides, a mobile station according to prior art must first synchronize with each of the base stations before determining whether the base station belongs to the target PLMN according to the third system information of the base station. Thus, if the base stations corresponding to the larger power values of broadcasting information in the base station table do not belong to the first priority PLMN, the prior art method for selecting a PLMN has to spend much time on sequentially synchronizing with these base stations and reading their third system information.

Furthermore, when a user uses his mobile phone in a foreign country, a roaming PLMN is selected because the home public land mobile network (HPLMN) cannot be selected in the foreign country. After the user goes back to his home country and turns on the mobile phone for the first time, the registered public land mobile network (RPLMN) for the mobile phone is still the roaming PLMN, and because the mobile phone set its RPLMN as the first priority PLMN, the mobile phone first searches the base station belonging to the roaming PLMN. However, there is no base station belonging to the roaming PLMN in the base station table. Even though the mobile phone cannot find any base station belonging to the RPLMN, the mobile station still takes time in synchronizing with all the base stations in the base station table and in reading their third system information. Only after confirming that there's no base station belonging to the RPLMN, the mobile phone starts to search a base station belonging to the HPLMN. Under foregoing conditions, the prior art method for selecting a PLMN is very ineffective.

SUMMARY OF THE INVENTION

The main purpose of this invention is providing a method and an apparatus for selecting a PLMN. The method and the apparatus can shorten the time of searching a PLMN for a mobile station and raise the efficiency of selecting a PLMN.

The method and the apparatus according to this invention use the first and the second system information included in the broadcasting information broadcasted by a base station to find out all of the base stations belonging to the same PLMN as that base station in the base station table, and group those base stations belonging to the same PLMN as a base station group. The method and the apparatus according to this invention only need to synchronize with one base station in a base station group, and the other base stations belonging to the same base station group as that base station are known. Accordingly, the selection method according to this invention can substantially reduce the time for selecting a PLMN and improve the corresponding efficiency.

The advantage and spirit of the invention may be understood by the following recitations together with the appended drawings.

BRIEF DESCRIPTION OF THE APPENDED DRAWINGS

FIG. 1 shows a base station table according to prior arts.

FIG. 2A through FIG. 2C show a base station table according to this invention.

DETAILED DESCRIPTION OF THE INVENTION

Figure 3:
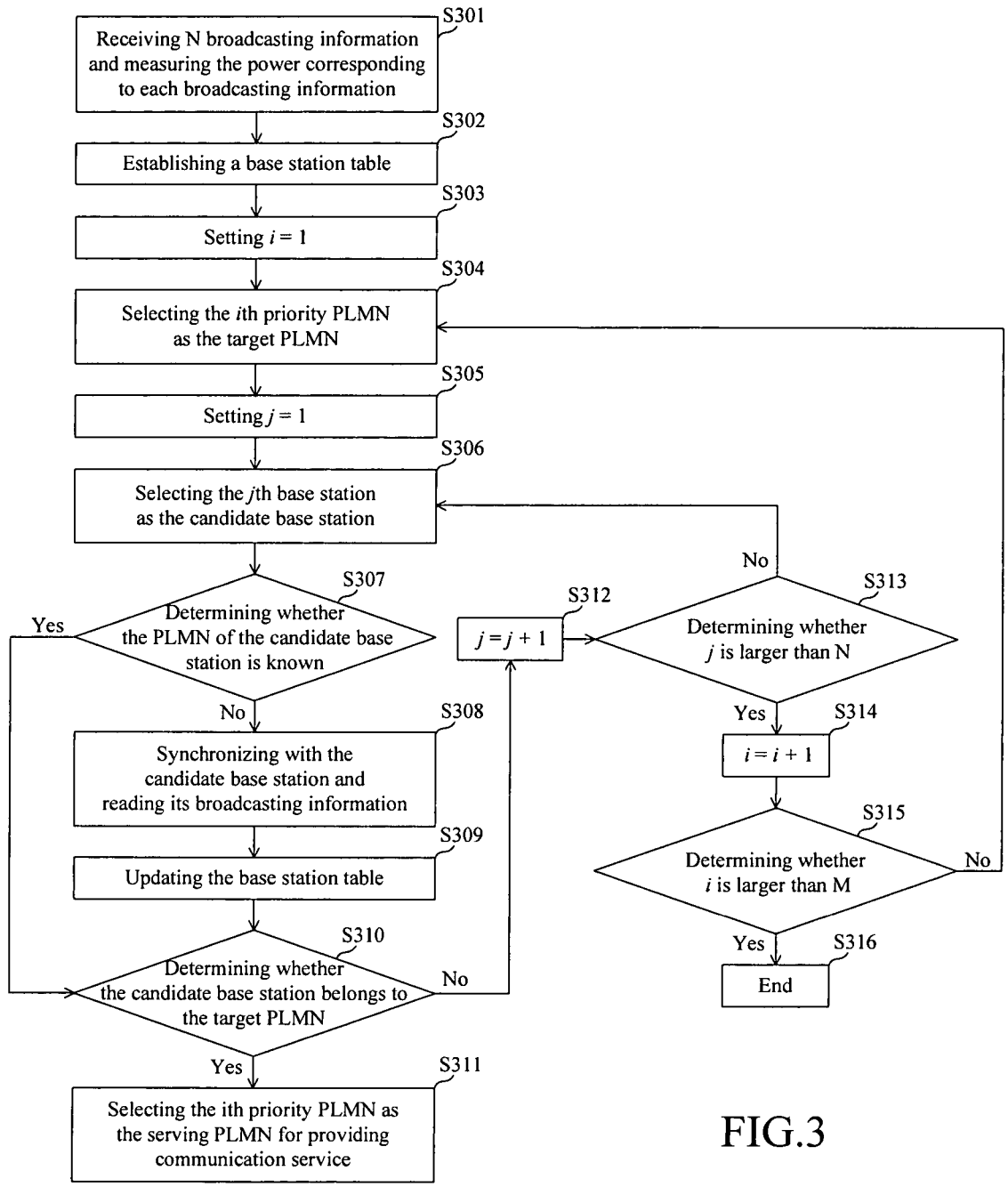
FIG. 3 shows the flow chart of the method according to one preferred embodiment of the invention.

The present invention relates to a method and an apparatus for selecting a PLMN. More specifically, this invention relates to a method and an apparatus that can shorten the time of selecting a PLMN.

The same as the prior arts, in this invention, the mobile phone monitors pieces of broadcasting information broadcasted by a plurality of base stations in the vicinity when a mobile phone is turned on. Assume the mobile phone can monitor ten pieces of broadcasting information broadcasted by ten base stations. After receiving and measuring the ten pieces of broadcasting information, the mobile phone establishes a base station table as shown in FIG. 2A. Compared with the base station table shown in FIG. 1, the base station table according to this invention has an additional PLMN field cell_plmn_index for recording the PLMN to which each of the base stations belongs.

The mobile phone sequentially searches the PLMN for each of the base stations in the base station table (As shown in FIG. 2A, the upper ones have larger power values of broadcasting information than the lower ones). In other words, the mobile phone first searches the PLMN to which the base station 10 with base station code "10" belongs.

The same as in the prior arts, a mobile station (for example, a mobile phone) must first synchronize with a base station before reading the broadcasting information broadcasted by that mobile station. The mobile station obtains the PLMN to which that base station belongs according to the third system information included in the broadcasting information. Unlike the prior arts, the selection method according to this invention further reads the first and the second system information included in the broadcasting information broadcasted by a base station besides the third system information. The second system information (SI2) includes a first list that is a broadcast control channel allocation list (BCCH Allocation list, BA list). The first list includes the base station codes of other base stations belonging to the same PLMN as the synchronized base station. The first system information includes a second list that is a cell allocation list (CA list). The CA list also includes the base station codes of other base stations belonging to the same PLMN as the base station.

In one method according to one preferred embodiment of this invention, the registered public land mobile network (RPLMN) is set as the first priority PLMN and the base station group including all of the base stations belonging to first priority PLMN is called the first base station group (Group_0). The home public land mobile network (HPLMN) is set as the second priority PLMN and the base station group including the base stations belonging to second priority PLMN is called the second base station group (Group_1). A first PLMN is set as the third priority PLMN and the base station group including the base stations belonging to third priority PLMN is called the third base station group (Group_2). A second PLMN is set as the fourth priority PLMN and the base station group including the base stations belonging to fourth priority PLMN is called the fourth base station group (Group_3). A third PLMN is set as the fifth priority PLMN and the base station group including the base stations belonging to fifth priority PLMN is called the fifth base station group (Group_4).

The method first receives and measures the ten pieces of broadcasting information broadcasted by the ten base stations, and then establishes a base station table. All of the initial values in the PLMN fields are set as ff (as shown in FIG. 2A) for representing that all of the PLMNs to which the N base stations belong are unknown.

At the beginning, the mobile phone first searches and selects the base stations belonging to the first priority PLMN.

The mobile phone first sets the base station 10 with a base station code "10" as a candidate base station, synchronizes with the base station 10, and reads its SI3 for knowing its PLMN. Assume the base station 10 belongs to the third priority PLMN. The cell_plmn_index corresponding to the base station 10 is set as 2 for representing the base station 10 belongs to the third priority PLMN.

Then, the mobile phone reads the BA list in the SI2 of the base station 10. Thus, the base station codes corresponding to the base stations belonging to the same PLMN as the base station 10 are known. Assume the BA list includes the base station codes "54", "88", and "107". The PLMN fields, i.e. cell_plmn_index, corresponding to the base stations 54, 88, and 107 are set as 2. FIG. 2B shows the updated base station table.

Because the base station 10 does not belong to the first priority PLMN, the mobile phone keeps on searching a base station belonging to the first priority PLMN. The base station 23 with a base station code "23" is then set as the candidate base station. The mobile phone synchronizes with the base station 23, and reads its SI3 for knowing its PLMN. Assume the base station 23 belongs to the fourth priority PLMN. The PLMN field, i.e. cell_plmn_index, corresponding to the base station 23 is set as 3 for representing that the base station 23 belongs to the fourth priority PLMN.

Then, the mobile phone reads the BA list in the SI2 for the base station 23. Thus, the base station codes corresponding to the base stations belonging to the same PLMN as the base station 23 are known. Assume the BA list includes base station codes "12", "18", and "66". The PLMN fields, i.e. cell_plmn_index, corresponding to the base stations 12, 18, and 66 are set as 3. Besides, the mobile phone also reads the CA list in the SI1 for the base station 23. Assume the CA list includes base station codes "134". The PLMN field, i.e. cell_plmn_index, corresponding to the base stations 134 is also set as 3. FIG. 2C shows the updated base station table.

Because the base station 23 does not belong to the first priority PLMN, the mobile phone keeps on searching a base station belonging to the first priority PLMN. The PLMNs to which the base stations 12, 88, 66, 18, 107, 134, and 54 belong are known and the PLMNs to which the base stations belong are not the first priority PLMN. The base station 35 with a base station code "35" is then set as the candidate base station directly. The mobile phone synchronizes with the base station 35, and reads its SI3 to know its PLMN. In other words, in the process of selecting a PLMN, the mobile phone only needs to synchronize with the base stations 10, 23, and 35 and read the broadcasting information for the three base stations. The method according to this invention does not need to synchronize with all of the base stations in the base station table. Accordingly, the selection method according to this invention has better efficiency.

Assume the base station 35 belongs to the fifth priority PLMN. The PLMN field, i.e. cell_plmn_index, corresponding to the base station 23 is set as 4 for representing the base station 35 belongs to the fifth priority PLMN. Because all of the base stations in the base station table don't belong to the first priority PLMN, the mobile then set the second priority PLMN as the target PLMN. According to the base station table, the mobile phone knows that all of the base stations in the base station table don't belong to the second priority PLMN without synchronizing with any of the base stations. Therefore, the mobile phone then sets the third priority PLMN as the target PLMN. The base station 10 belongs to the third priority PLMN. Thus, the PLMN to which the base station 10 belongs is selected as the PLMN for providing communication services. Assume that it is suitable for the mobile phone to select the first, second, third, fourth, or fifth priority PLMN as the serving PLMN for providing communication services. If all of the base stations in the base station table don't belong to any of the first through the fifth priority PLMNs, the method is then terminated.

Please refer to FIG. 3. FIG. 3 shows the flow chart of the method according to one preferred embodiment of the invention. The method is applied in a mobile station (for example, a mobile phone) and comprises the following steps of:

S301: receiving N pieces of broadcasting information broadcasted by N base stations (for instance, ten base stations) respectively and measuring the power values of the ten pieces of broadcasting information, wherein N is a natural number;

S302: establishing a base station table for recording N sets of information, wherein each set of information is corresponding to one base station among the N base stations, and each set of information comprises a measured power value of broadcasting information, a base station code, and a PLMN code corresponding to one of the N base stations, the N sets of information are recorded in the base station table in sequence according to the magnitudes of the N power values (the upper ones have larger power values than the lower ones), wherein the base station corresponding to the first set of information in the sequence is called a first base station (it has the maximum power value of broadcasting information), the base station corresponding to the second set of information in the sequence is called a second base station, and the base station corresponding to the Nth set of information in the sequence is called a Nth base station (it has the minimum power value of broadcasting information), all of the initial values in the PLMN fields are set as "ff" for representing that all of the PLMNs to which the N base stations belong are unknown;

S303: setting the initial value of an integer index i as one;

S304: selecting an ith priority PLMN as a target PLMN;

S305: setting the initial value of an integer index j as one;

S306: selecting the jth base station among the N base stations as a candidate base station;

S307: according to the value in the PLMN field, i.e. the PLMN code, corresponding to the candidate base station in the base station table, determining whether the PLMN to which the candidate base station belongs is known (unequal to ff), if the result of step S307 is YES, then executing step S310, if the result of step S307 is NO (equal to ff), then executing step S308;

S308: synchronizing the mobile station with the candidate base station and reading the SI1, SI2, and SI3 in the broadcasting information broadcasted by the candidate base station;

S309: according to the SI3 in the broadcasting information broadcasted by the candidate base station, updating the value in the PLMN field, i.e. the PLMN code, corresponding to the candidate base station in the base station table, according to the SI1 and the SI2 in the broadcasting information broadcasted by the candidate base station, finding out in the base station table the base stations that belongs to the same PLMN as the candidate base station, and updating the values in the PLMN fields corresponding to the base stations, which belongs to the same PLMN as the candidate base station, in the base station table;

S310: according to the value in the PLMN field, i.e. the PLMN code, corresponding to the candidate base station in the base station table, determining whether the candidate base station belongs to the target PLMN, if the result of step S310 is YES, then executing step S311, if the result of step S310 is NO, then executing step S312;

S311: selecting the ith priority PLMN as the serving PLMN that provides communication services to the mobile station;

S312: setting j=j+1;

S313: determining whether j is larger than N, if the result of step S313 is YES, then executing step S314, if the result of step S313 is NO, then returning back to step S306;

S314: setting i=i+1;

S315: determining whether i is larger than M, wherein M represents the number of PLMNs, among those it is suitable for the mobile station to select one as a serving PLMN, and M is a natural number (for instance, if it is suitable for the mobile station to select one among the first through the fifth priority PLMNs as a serving PLMN, then M is five), if the result of step S315 is YES, then executing step S316, if the result of step S315 is NO, then returning back to step S304; and S316: terminating said method.

Figure 4:
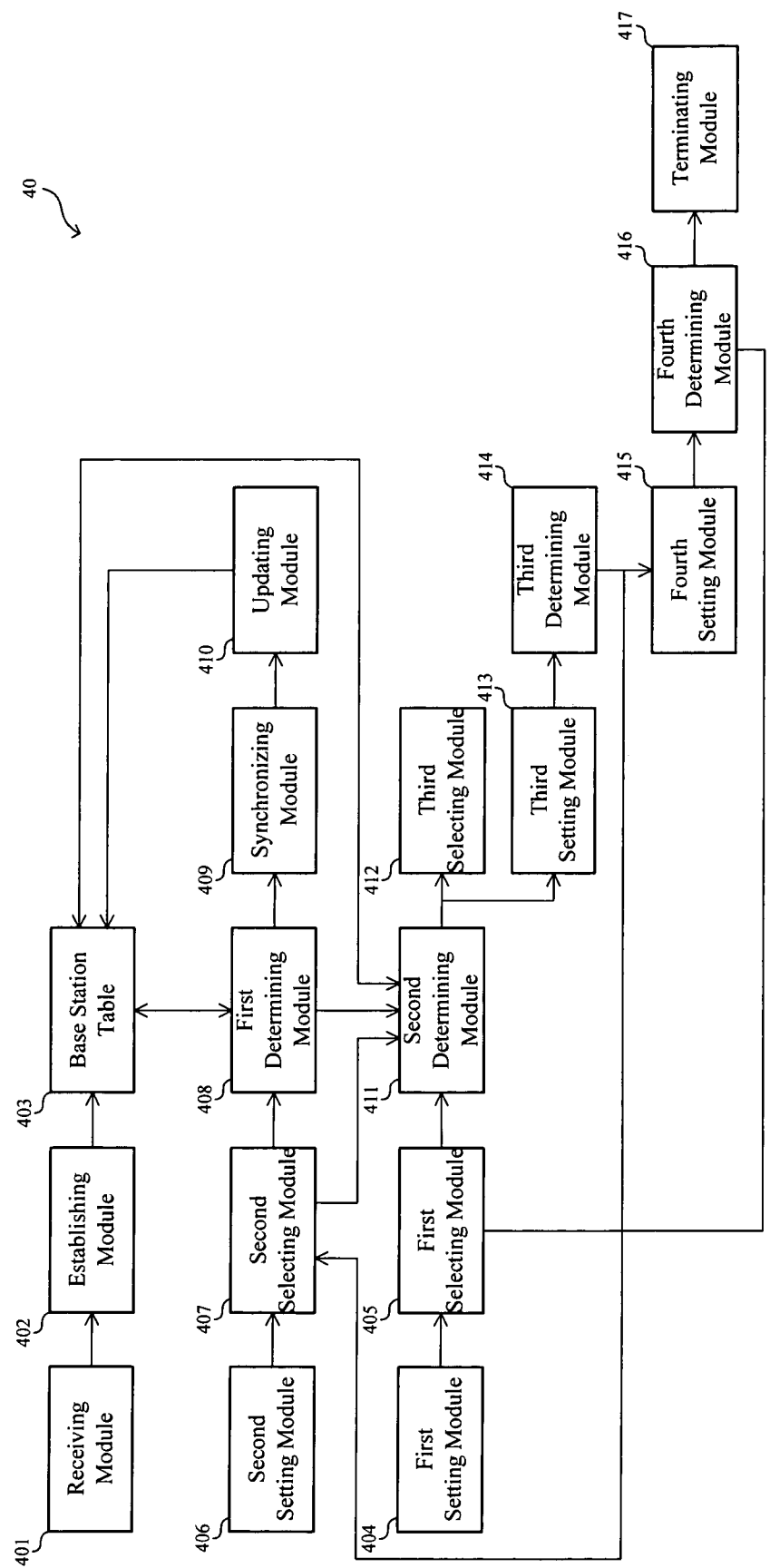
FIG. 4 shows the block diagram of the apparatus according to one preferred embodiment of the invention.

Please refer to FIG. 4. FIG. 4 shows the block diagram of the apparatus according to one preferred embodiment of the invention. The apparatus 40 is applied in a mobile station and comprises: a receiving module 401, an establishing module 402, a base station table 403, a first setting module 404, a first selecting module 405, a second setting module 406, a second selecting module 407, a first determining module 408, a synchronizing module 409, an updating module 410, a second determining module 411, a third selecting module 412, a third setting module 413, a third determining module 414, a fourth setting module 415, a fourth determining module 416, and a terminating module 417.

The receiving module 401 is used for receiving pieces of broadcasting information broadcasted by N base stations (for example, ten base stations) respectively and measuring the power values corresponding to the broadcasting information.

The establishing module 402 is used for establishing a base station table 403 for recording N sets of information. Each set of information is corresponding to one of the N base stations. Each set of information comprises a measured power value of broadcasting information, a base station code, and a PLMN code corresponding to one of the N base stations. The N sets of information is recorded in the base station table 403 in sequence according to the magnitudes of the N power values of broadcasting information (the upper ones have larger power values than the lower ones), wherein the base station corresponding to the first set of information in the sequence is called as a first base station (it has the maximum power value of broadcasting information), the base station corresponding to the second set of information in the sequence is called as a second base station, and the base station corresponding to the Nth set of information in the sequence is called as a Nth base station (it has the minimum power value of broadcasting information).

The first setting module 404 is used for setting the initial value of an integer index i as one.

The first selecting module 405 is used for selecting an ith preferred PLMN as a target PLMN.

The second setting module 406 is used for setting the initial value of an integer index j as one.

The second selecting module 407 is used for selecting the jth base station among the N base stations as a candidate base station.

The first determining module 408 is used for determining whether the PLMN to which the candidate base station belongs is known according to the PLMN code corresponding to the candidate base station recorded in the base station table 403.

The synchronizing module 409 operates based on the determined result of the first determining module. If the determined result of the first determining module 408 is NO, then the synchronizing module 409 synchronizes the mobile station with the candidate base station and reads the SI1, SI2, and SI3 in the broadcasting information broadcasted by the candidate base station.

The updating module 410 updates the PLMN code corresponding to the candidate base station in the base station table 403 according to the SI3 in the broadcasting information broadcasted by the candidate base station, finds out in the base station table 403 the base stations that belongs to the same PLMN as the candidate base station according to the SI1 and the SI2 in the broadcasting information broadcasted by the candidate base station, and then updates the PLMN codes corresponding to the base stations, which belongs to the same PLMN as the candidate base station, in the base station table 403.

The second determining module 411 is used for determining whether the candidate base station belongs to the target PLMN according to the PLMN code corresponding to the candidate base station recorded in the base station table 403.

The third selecting module 412 operates based on the determined result of the second determining module 411, if the determined result of the second determining module 411 is YES, then the third selecting module 412 selects the ith priority PLMN as the serving PLMN that provides communication services to the mobile station.

The third setting module 413 operates based on the determined result of the second determining module 411, if the determined result of the second determining module 411 is NO, then the third setting module sets j=j+1.

The third determining module 414 is used for determining whether j, which is set by the third setting module 413, is larger than N. If the determined result of the third determining module 414 is NO, then j, which is set by the third setting module 413, is transferred to the second selecting module 407.

The fourth setting module 415 operates based on the determined result of the third determining module 414. If the determined result of the third determining module 414 is YES, then the fourth setting module 415 sets i=i+1.

The fourth determining module 416 is used for determining whether i, which is set by the fourth setting module 415, is larger than M. If the determined result of the fourth determining module 416 is NO, then i, which is set by the fourth setting module 415, is transferred to the first selecting module 405.

The terminating module 417 operates based on the determined result of the fourth determining module 416. If the determined result of the fourth determining module 416 is YES, then the terminating module 417 terminates the operation of said apparatus 40.

The method according to this invention can also be embodied in a computer program product, which includes a storage medium. The storage medium has an embedded computer program, which is used for performing the operation of selecting a PLMN to provide communication services to a mobile station. When the computer program is executed by the mobile station, i.e. the mobile phone, the computer program makes the mobile station execute the flow chart as shown in FIG. 3.

The method and the apparatus according to this invention utilize the SI1 and SI2 in broadcasting information to find out the base stations belonging to the same PLMN in the base station table. The method and the apparatus according to this invention only need to synchronize with one of the base stations belonging to the same PLMN, and all of the base stations belonging to the same PLMN as the synchronized base station are known. Accordingly, the selection method according to this invention can substantially reduce the time for selecting a PLMN and improve the corresponding efficiency.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for selecting a public land mobile network (PLMN), said method being applied in a mobile station, wherein it is suitable for the mobile station to select one among M PLMNs to be a serving PLMN for providing communication services, and M is a natural number, said method comprising the following steps of:

(a) receiving N pieces of broadcasting information broadcasted by N base stations respectively and measuring power values of broadcasting information corresponding to the N base stations, wherein N is a natural number;

(b) establishing a base station table for recording N sets of information, each set of information being corresponding to one base station among the N base stations, each set of information comprising a measured power value, a base station code, and a PLMN code corresponding to one of the N base stations, the N sets of information being recorded in the base station table in sequence according to the magnitudes of the N power values of broadcasting information, wherein the base station corresponding to the first set of information in the sequence is called as a first base station, the base station corresponding to the second set of information in the sequence is called as a second base station, and the base station corresponding to the Nth set of information in the sequence is called as a Nth base station;

(c) setting the initial value of an integer index i as one;

(d) selecting an ith priority PLMN as a target PLMN;

(e) setting the initial value of an integer index j as one;

(f) selecting the jth base station among the N base stations as a candidate base station;

(g) according to the PLMN code corresponding to the candidate base station recorded in the base station table, determining whether the PLMN to which the candidate base station belongs is known, if the result of step (g) is YES, then executing step (j), if the result of step (g) is NO, then executing step (h);

(h) synchronizing the mobile station with the candidate base station and reading the broadcasting information broadcasted by the candidate base station;

(i) updating the value in a PLMN field of the base station table;

(j) according to the PLMN code corresponding to the candidate base station recorded in the base station table, determining whether the candidate base station belongs to the target PLMN, if the result of step (j) is YES, then executing step (k), if the result of step (j) is NO, then executing step (l);

(k) selecting the ith priority PLMN as the serving PLMN that provides communication services to the mobile station;

(l) setting j=j+1;

(m) determining whether j is larger than N, if the result of step (in) is YES, then executing step (n), if the result of step (in) is NO, then returning back to step (f); (n) setting i=i+1;

(o) determining whether i is larger than M, if the result of step (o) is YES, then executing step (p), if the result of step (o) is NO, then returning back to step (d); and (p) terminating said method.

2. The method of claim 1, wherein the mobile station is a mobile phone or a PDA.

3. The method of claim 1, wherein the broadcasting information comprises a first system information (SI1), a second system information (SI2), and a third system information (SI3).

4. The method of claim 3, wherein step (i) comprises the following sub-steps of:

(i1) according to the third system information in the broadcasting information broadcasted by the candidate base station, updating the PLMN code corresponding to the candidate base station in the base station table; and (i2) according to the first system information and the second system information in the broadcasting information broadcasted by the candidate base station, finding out in the base station table the base stations that belongs to the same PLMN as the candidate base station, and updating the PLMN codes corresponding to the base stations, which belongs to the same PLMN as the candidate base station, in the base station table.

5. The method of claim 1, wherein the first priority PLMN is the registered public land mobile network (RPLMN) for the mobile station.

6. The method of claim 1, wherein the second priority PLMN is the home public land mobile network (HPLMN) for the mobile station.

7. The method of claim 1, wherein in step (k), the method selects the jth base station as the base station that provides communication services to the mobile station.

8. A mobile station for selecting a public land mobile network (PLMN), wherein it is suitable for the mobile station to select one among M PLMNs to be a serving PLMN, and M is a natural number, said apparatus comprising:

a receiving module for receiving ten pieces of broadcasting information broadcasted by N base stations respectively and measuring the power values of broadcasting information corresponding to the N base stations, wherein N is a natural number;

an establishing module for establishing a base station table for recording N sets of information, each set of information being corresponding to one base station among the N base stations, each set of information comprising a measured power value, a base station code, and a PLMN code corresponding to one base station among the N base stations, the N sets of information being recorded in the base station table in sequence according to the magnitudes of the N power values of broadcasting information, wherein the base station corresponding to the first set of information in the sequence is called as a first base station, the base station corresponding to the second set of information in the sequence is called as a second base station, and the base station corresponding to the Nth set of information in the sequence is called as a Nth base station;

a first setting module for setting the initial value of an integer index i as one;

a first selecting module for selecting an ith priority PLMN as a target PLMN;

a second setting module for setting the initial value of an integer index j as one;

a second selecting module for selecting the jth base station among the N base stations as a candidate base station;

a first determining module for determining whether the PLMN to which the candidate base station belongs is known according to the PLMN code corresponding to the candidate base station recorded in the base station table;

a synchronizing module operating based on the determined result of the first determining module, if the determined result of the first determining module is NO, then the synchronizing module synchronizing the mobile station with the candidate base station and reading the broadcasting information broadcasted by the candidate base station;

an updating module for updating the value in a PLMN field of the base station table according to the broadcasting information read by the synchronizing module;

a second determining module for determining whether the candidate base station belongs to the target PLMN according to the PLMN code corresponding to the candidate base station recorded in the base station table;

a third selecting module operating based on the determined result of the second determining module, if the determined result of the second determining module is YES, then the third selecting module selecting the ith priority PLMN as the serving PLMN that provides communication services to the mobile station;

a third setting module operating based on the determined result of the second determining module, if the determined result of the second determining module is NO, then the third setting module setting j=j+1;

a third determining module for determining whether j, which is set by the third setting module, is larger than N, if the determined result of the third determining module is NO, then the j, which is set by the third setting module, being transferred to the second selecting module;

a fourth setting module operating based on the determined result of the third determining module, if the determined result of the third determining module is YES, then the fourth setting module setting i =i+1;

a fourth determining module for determining whether i, which is set by the fourth setting module, is larger than M, if the determined result of the fourth determining module is NO, then the i, which is set by the fourth setting module, is transferred to the first selecting module; and a terminating module operating based on the determined result of the fourth determining module, if the determined result of the fourth determining module is YES, then the terminating module terminating the operation of said apparatus.

9. The mobile station of claim 8, wherein the mobile station is a mobile phone or a PDA.

10. The mobile station of claim 8, wherein the broadcasting information comprises a first system information (SI1), a second system information (SI2), and a third system information (SI3).

11. The mobile station of claim 10, wherein the updating module updates the PLMN code corresponding to the candidate base station in the base station table according to the third system information in the broadcasting information broadcasted by the candidate base station, finds out in the base station table the base stations that belongs to the same PLMN as the candidate base station according to the first system information and the second system information in the broadcasting information broadcasted by the candidate base station, and then updates the PLMN codes corresponding to the base stations, which belongs to the same PLMN as the candidate base station, in the base station table.

12. The mobile station of claim 8, wherein the first priority PLMN is the registered public land mobile network (HPLMN) for the mobile station.

13. The mobile station of claim 8, wherein the second priority PLMN is the home public land mobile network (HPLMN) for the mobile station.

14. The mobile station of claim 8, wherein if the determined result of the second determining module is YES, then the third selecting module selects the jth base station as the serving base station that provides communication services to the mobile station.

15. A computer program product stored on a computer-readable medium the computer-readable medium having an embedded computer program for selecting a public land mobile network (PLMN) for a mobile station, wherein it is suitable for the mobile station to select one among M PLMNs to be a serving PLMN for providing communication services, and M is a natural number, when being executed by the mobile station, the computer program making the mobile station perform the following steps of:

(a) receiving N pieces of broadcasting information broadcasted by N base stations respectively and measuring power values of broadcasting information corresponding to the N base stations, wherein N is a natural number;

(b) establishing a base station table for recording N sets of information, each set of information being corresponding to one base station among the N base stations, each set of information comprising a measured power value, a base station code, and a PLMN code corresponding to one of the N base stations, the N sets of information being recorded in the base station table in sequence according to the magnitudes of the N power values of broadcasting information, wherein the base station corresponding to the first set of information in the sequence is called as a first base station, the base station corresponding to the second set of information in the sequence is called as a second base station, and the base station corresponding to the Nth set of information in the sequence is called as a Nth base station;

(c) setting the initial value of an integer index i as one;

(d) selecting an ith priority PLMN as a target PLMN;

(e) setting the initial value of an integer index j as one;

(f) selecting the jth base station among the N base stations as a candidate base station;

(g) according to the PLMN code corresponding to the candidate base station recorded in the base station table, determining whether the PLMN to which the candidate base station belongs is known, if the result of step (g) is YES, then executing step (j), if the result of step (g) is NO, then executing step (h);

(h) synchronizing the mobile station with the candidate base station and reading the broadcasting information broadcasted by the candidate base station;

(i) updating the value in a PLMN field of the base station table;

(j) according to the PLMN code corresponding to the candidate base station recorded in the base station table, determining whether the candidate base station belongs to the target PLMN, if the result of step (k) is YES, then executing step (k), if the result of step (I) is NO, then executing step (1);

(k) selecting the ith priority PLMN as the serving PLMN that provides communication services to the mobile station;

(l) setting j=j+1;

(m) determining whether j is larger than N, if the result of step (m) is YES, then executing step (n), if the result of step (m) is NO, then returning back to step (f);

(n) setting i=i+1;

(o) determining whether i is larger than M, if the result of step (o) is YES, then executing step (p), if the result of step (o) is NO, then returning back to step(d); and (p) terminating said computer program.

16. The computer program product of claim 15, wherein the mobile station is a mobile phone or a PDA.

17. The computer program product of claim 15, wherein the broadcasting information comprises a first system information (SI1), a second system information (SI2), and a third system information (SI3).

18. The computer program product of claim 17, wherein step (i) comprises the following sub-steps of:

(i1) according to the third system information in the broadcasting information broadcasted by the candidate base station, updating the PLMN code corresponding to the candidate base station in the base station table; and (i2) according to the first system information and the second system information in the broadcasting information broadcasted by the candidate base station, finding out in the base station table the base stations that belongs to the same PLMN as the candidate base station, and updating the PLMN codes corresponding to the base stations, which belongs to the same PLMN as the candidate base station, in the base station table.

19. The computer program product of claim 15, wherein the first priority PLMN is the registered public land mobile network (RPLMN) for the mobile station.

20. The computer program product of claim 15, wherein the second priority PLMN is the home public land mobile network (HPLMN) for the mobile station.

21. The computer program product of claim 15, wherein in step (k), the computer program selects the jth base station as the serving base station that provides communication services to the mobile station.

22. A method for obtaining at least one public land mobile network (PLMN) code corresponding to at least one base station, said method being applied in an electronic apparatus and comprising the following steps of:
receiving N pieces of broadcasting information broadcasted by N base stations respectively and measuring power values of broadcasting information corresponding to the N base stations, wherein N is a natural number;
selecting one base station among the N base stations, the selected base station having a larger power value of broadcasting information and being called as a first base station; and
reading the broadcasting information broadcasted by the first base station, obtaining the PLMN code corresponding to the first base station, and finding out at least one base station, which belongs to the same PLMN as the first base station and is called as a second base station, corresponding to which the PLMN code is known.

23. The method of claim 22, wherein the electronic system is a mobile phone or a PDA.

24. The method of claim 23, wherein the PLMN code corresponding to the first base station is obtained by reading the third system information included in the broadcasting information broadcasted by the first base station, the second base station is found out by reading the first and the second system information included in the broadcasting information broadcasted by the first base station.

25. The method of claim 22, wherein the broadcasting information comprises a first system information (SI1), a second system information (SI2), and a third system information (SI3).

26. An electronic apparatus for obtaining at least one public land mobile network (PLMN) code corresponding to at least one base station, comprising:
a receiving module for receiving N pieces of broadcasting information broadcasted by N base stations respectively and measuring power values of broadcasting information corresponding to the N base stations, wherein N is a natural number;
a selecting module for selecting one base station among the N base stations, the selected base station having a larger power value of broadcasting information and being called as a first base station; and
a reading module for reading the broadcasting information broadcasted by the first base station, obtaining the PLMN code corresponding to the first base station, and finding out at least one base station, which belongs to the same PLMN as the first base station and is called as a second base station, corresponding to which the PLMN code is known.

27. The electronic apparatus of claim 26, wherein the electronic apparatus is a mobile phone or a PDA.

28. The electronic apparatus of claim 26, wherein the broadcasting information comprises a first system information (SI1), a second system information (SI2), and a third system information (SI3).

29. The electronic apparatus of claim 28, wherein the PLMN code corresponding to the first base station is obtained by reading the third system information included in the broadcasting information broadcasted by the first base station, the second base station is found out by reading the first and the second system information included in the broadcasting information broadcasted by the first base station.

30. A computer program product stored on a computer-readable medium the computer-readable medium having an embedded computer program for obtaining at least one PLMN code corresponding to at least one base station, when the computer program being executed by an electronic apparatus, the computer program making the electronic apparatus perform the following steps of:
receiving N pieces of broadcasting information broadcasted by N base stations respectively and measuring power values of broadcasting information corresponding to the N base stations, wherein N is a natural number;
selecting one base station among the N base stations, the selected base station having a larger power value of broadcasting information and being called as a first base station; and
reading the broadcasting information broadcasted by the first base station, obtaining the PLMN code corresponding to the first base station, and finding out at least one base station, which belongs to the same PLMN as the first base station and is called as a second base station, corresponding to which the PLMN code is known.

31. The computer program product of claim 30, wherein the electronic apparatus is a mobile phone or a PDA.

32. The computer program product of claim 30, wherein the broadcasting information comprises a first system information (SI1), a second system information (SI2), and a third system information (SI3).

33. The computer program product of claim 32, wherein the PLMN code corresponding to the first base station is obtained by reading the third system information of the broadcasting information broadcasted by the first base station, the second base station is found out by reading the first and the second system information of the broadcasting information broadcasted by the first base station.

* * * * *